US006214938B1

(12) United States Patent

Yau et al.

(10) Patent No.: US 6,214,938 B1

(45) Date of Patent: Apr. 10, 2001

(54) OVERCOAT MATERIAL AS PROTECTING LAYER FOR IMAGE RECORDING MATERIALS

(75) Inventors: Hwei-Ling Yau, Rochester; Tienteh Chen, Penfield; David E. Decker; Stephan L. Twist, both of Rochester; Kevin M. O'Connor, Webster, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/567,718

(22) Filed: May 10, 2000

Related U.S. Application Data

(62) Division of application No. 09/354,055, filed on Jul. 15, 1999, now Pat. No. 6,130,014.

(51) Int. Cl.[7] ............................ C08L 33/06; C08L 33/18; C08L 37/00

(52) U.S. Cl. ............................ 525/209; 525/228; 525/230

(58) Field of Search .................................... 525/209, 228, 525/230

(56) References Cited

U.S. PATENT DOCUMENTS 5,952,130 * 9/1999 Yau et al. .............................. 430/11

* cited by examiner

*Primary Examiner*—Nathan M. Nutter

(74) *Attorney, Agent, or Firm*—Doreen M. Wells

(57) ABSTRACT

The present invention is a coating composition comprising at least one first water insoluble polymer having a Tg equal to or less than 30° C. and at least one second water insoluble polymer having a Tg equal to or greater than 60° C. wherein the first polymer comprises a monomer at a weight percent of 75 to 100 of the monomer represented by the following formula 1:

(1)

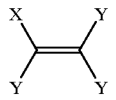

wherein: X is selected from the group consisting of —Cl, —F, or —CN, and Y is each independently selected from the group consisting of H, Cl, F, CN, $CF_3$, $CH_3$, $C_2H_5$, n—$C_3H_7$, iso—$C_3H_7$, n—$C_4H_9$, n—$C_5H_{11}$, n—$C_6H_{13}$, $OCH_3$, $OC_2H_5$, phenyl, $C_6F_5$, $C_6Cl_5$, $CH_2Cl$, $CH_2F$, Cl, F, CN, $CF_3$, $C_2F_5$, n—$C_3F_7$, iso—$C_3F_7$, $OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$; and the second polymer is a microgel particle.

9 Claims, No Drawings

OVERCOAT MATERIAL AS PROTECTING LAYER FOR IMAGE RECORDING MATERIALS

CROSS REFERENCE TO PRIORITY APPLICATION

This application is a divisional of U.S. Ser. No. 09/354,055 filed Jul. 15, 1999 and now U.S. Pat. No. 6,130,014.

CROSS REFERENCE TO RELATED APPLICATIONS

The present invention is related to commonly owned U.S. applications filed on even date herewith: titled PROTECTING LAYER FOR GELATIN BASED PHOTOGRAPHIC PRODUCTS CONTAINING 1H-PYRAZOLO[1,5-b][1,2,4]TRIAZOLE-TYPE MAGENTA COUPLER.

FIELD OF THE INVENTION

The present invention relates to image recording materials. More particularly the present invention provides a protective overcoat which overcomes the problem of image instability to light exposure associated with the use of other types of protective overcoats.

BACKGROUND OF THE INVENTION

Gelatin or other hydrophilic polymers are commonly used as binders in image recording materials such as silver-based photographic materials and ink-jet receiver materials. These products are known to be very swellable when in contact with water. The swelling property is essential in order to accomplish photographic processing chemistry or to absorb ink to generate images. However, the same property also inhibits end users from fully enjoying the product, such as handling without worry about spilling drinks or leaving fingerprints, or having to keep negatives or prints in envelopes or storage sleeves in order to avoid scratches.

The concept of applying a colloidal suspension to moist film or print material at the end of photographic processing has been disclosed in U.S. Pat. No. 2,173,480 (1939). However, since the best way to use this technology is to implement it in currently existing photofinishing equipment and laboratories, useful inventions must focus on material compositions that will best fit in with current photofinishing systems. Teachings on various methods and apparatus for applying a controlled amount of material on the silver-based photographic materials during photographic processing have been filed: U.S. Ser. No. 08/965,560 (filed Nov. 6, 1997), U.S. Pat. No. 5,905,924 and U.S. Pat No. 5,875,370.

The temperature and residence time of photographic materials in the drying section of photofinishing trade equipment vary from 50° C. to 70° C. and from 30 seconds to 2.5 minutes. The actual temperature of gelatin coating during drying is much lower than the temperature set for the dryer due to the evaporation of water. In addition, it is necessary to be free of volatile organic compound (VOC) in the formulation in order to be user and environment friendly. Under these stringent requirements, it appears that an aqueous colloidal dispersion of water insoluble polymeric materials is the only appropriate system for this technology. Water soluble materials will not provide any water resistance property.

U.S. Pat. No. 2,719,791 describes the use of an aqueous dispersion of organic plastic material, which yields a water impermeable coating on drying. However, it is known that when dispersions of low Tg material (Tg<25° C.) are used to obtain a water resistant protective coating, the surface of the protective coating has an undesirable tacky characteristic, which generally degrades other physical properties in customers hands, such as print blocking, fingerprinting, dust attraction and high scratch propensity. When dispersions of high Tg materials (Tg>25° C.) are used, it is not possible to form a continuous water resistance layer on the prints under the drying condition described above. U.S. Pat. No. 2,751,315 also describes the use of aqueous dispersion of copolymer materials. It was recognized in the patent that the low Tg materials were not quite suitable and therefore higher Tg polymer in combination with a high-boiling-point organic cosolvent was used in order to form a water resistant protective coating. However, the organic solvent that is released from the formulation during drying creates an environmental concern if used in the current photofinishing laboratories with high throughput. U.S. Pat No. 2,956,877 describes the method of applying a solution that would solubilize the processing reagents from the photographic materials as well as forming a protective coating on its surface. The disadvantage of this approach is that not only can the acid groups on the polymer degrade the water resistant property of the final protective layer, but also the organic solvent required in the formulation is, again, not suitable for high volume photofinishing laboratories.

A series of patents describes the application of UV-polymerizable monomers and oligomers on imaged photographic materials followed by UV exposure to cure the formulation in order to obtain a crosslinked durable protective layer, e.g. U.S. Pat. Nos. 4,092,173, 4,171,979, 4,333,998 and 4,426,431. The major concern for this type of technology is that the use of highly toxic multi-functional monomer compounds in the formulation prevents it from being environmentally and user friendly, and the relatively short shelf life of the coating solutions.

U.S. Pat. No. 5,376,434 describes the use of at least two resins in the protective overcoat layer of a photographic print, at least one first resin having a glass transition temperature (Tg) of not less than 80° C., and at least one second resin having a Tg of 0° C. to 30° C., wherein an arithmetic mean of the glass transition temperatures of said first resin and said second resin is 30° C. to 70° C. The patent teaches the use of the high Tg resin to reduce the stickiness of the overcoat due to the low Tg material.

U.S. Pat. No. Pat. 5,447,832 describes coating compositions for imaging elements comprising aqueous-based mixtures of lower Tg, film-forming polymeric particles and higher-Tg, non-film-forming polymeric particles. The film-forming particles provide continuous film formation and the non-film-forming particles comprising glassy polymers provide resistance to tackiness, blocking, ferrotyping, abrasion and scratching.

While recognizing the above-mentioned benefits of two-component aqueous dispersions cited in U.S. Pat. No. 5,376,434 and 5,447,832, U.S. Ser. No. 09/136,375 (filed Aug. 19, 1998; notice of allowance received Apr. 10, 1999) further disclosed preferred substituents on the high and low Tg components in two-latex formulations in order to obtain improved fingerprint resistance. Most preferred monomers are acrylonitrile, methacrylonitrile, vinylidene chloride and vinylidene fluoride.

U.S. Ser. No. 09/136,375 further describes the use of a combination of at least two aqueous colloidal dispersions of water insoluble polymeric materials for protective overcoat of silver halide photographic prints, at least one has Tg less than 25° C. and at least one has Tg equal to or greater than 25° C. The low Tg material comprises 20% to 95% by weight of the total material laydown, and the high Tg material comprises 5% to 80% by weight of the total material laydown. Furthermore, to provide fingerprint resistance, at least one of the materials used in the combination, regardless of its Tg, contains one or more comonomers of that invention (see formula (1) below) at 20% to 100% by weight based on the total monomers, (1)

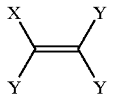

wherein: X is selected from the group consisting of Cl, F or CN, and Y is each independently selected from the group consisting of H, Cl, F, CN, $CF_3$, $CH_3$, $C_2H_5$, n—$C_3H_7$, iso—$C_3H_7$, n—$C_4H_9$, n—$C_5H_{11}$, n—$C_6H_{13}$, $OCH_3$, $OC_2H_5$, phenyl, $C_6F_5$, $C_6Cl_5$, $CH_2Cl$, $CH_2F$, $C_2F_5$, n—$C_3F_7$, iso—$C_3F_7$, $OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$.

The preferred monomers of formula (1) of this invention are acrylonitrile, methacrylonitrile, vinylidene chloride, vinylidene fluoride, vinylidene cyanide, vinyl chloride, vinyl fluoride, tetrafluoroethylene, hexafluoropropylene, perfluoropropyl vinyl ether, substituted acrylonitriles including 2-ethylacrylonitrile, 2-n-propylacrylonitrile, 2-isopropylacrylonitrile, 2-n-butylacrylonitrile, 2-n-hexylacrylonitrile, 2-trifluoromethylacrylonitrile, 2-cyanoacrylonitrile, 2-chloroacrylonitrile, 2-bromoacrylonitrile,2-ethoxyacrylonitrile, cis-3-methoxyacrylonitrile, cis-3-ethoxyacrylonitrile 2-acetoxyacrylonitrile, fumaronitrile, maleonitrile. Most preferred monomers are, acrylonitrile, vinylidene chloride, and methacrylonitrile.

U.S. Ser. No. 09/354,209 of Yau et al. filed herewith, titled PROTECTING LAYER FOR IMAGE RECORDING MATERIALS describes the preferred class of materials giving superior fingerprint resistance. The glass transition temperature of the material is preferred to be lower than 30° C. in order to coalesce under the mild drying conditions the image recording material experiences in photoprocessing or ink-jet printing equipment. However, during the process of coating and drying these types of latices, undesirable mobility of chemicals between image layers occurs due to the early fast film formation rate before the water is completely evaporated. The migration of chemicals within the layers can sometimes deteriorate the light fastness of image dyes.

Therefore, there is need for novel overcoat compositions for silver-based photographic and ink-jet receiver materials which can overcome the undesirable mobility of chemicals between image layers that degrades image stability to light exposure, while maintaining resistance to water, fingerprints and scratching and not adversely affecting gloss and other viewing characterisitics.

SUMMARY OF THE INVENTION

The present invention describes a novel material composition that can be applied to the silver-based photographic materials or ink-jet receiver materials after image formation to produce a layer that is resistant to water, scratch and fingerprints and at the same time does not degrade the image stability to light exposure. The formulation of this invention is a combination of at least two aqueous colloidal dispersions of water insoluble polymeric materials, at least one having a Tg equal to or less than 30° C. and containing one or more comonomers of the invention (see structure (1) below) at 75% to 100% and preferably 80% to 95% by weight based on the total monomers in the composition.

The composition contains at least one additional latex having Tg equal to or greater than 60° C. and having average particle size between 20 nm and 80 nm and preferably 30 nm to 70 nm. The second latex is a microgel particle (MP). The thus obtained overcoat for image recording materials has superior stain resistance, wet and dry scratch resistance, fingerprint resistance, and does not deteriorate the light stability of the image dyes. Microgel particles are highly crosslinked polymer particles prepared by emulsion polymerization. Microgel particles of this invention are typically comprised, based on total weight of the monomer mixture, from about 5 to 50%, most preferably from about 5 to 20%, of a polymerizable carboxylic acid monomer, 2 to 20% of a difunctional crosslinking monomer, with the balance of the microgel composition comprising water-insoluble, ethylenically unsaturated or vinyl-type monomers.

Hence, the present invention discloses an image recording element comprising:

a support;

at least one light sensitive silver halide emulsion layer or ink-receptive layer superposed on the support; and an overcoat layer overlying the at least one light sensitive silver halide emulsion layer or ink-receptive layer comprising at least one first water insoluble polymer having a Tg equal to or less than 30° C. and at least one second water insoluble polymer having a Tg equal to or greater than 60° C. and average particle size between 20 and 80 nm, and preferably between 30 and 70 nm, wherein the first polymer comprises a monomer at a weight percent of 75 to 100, and preferably 80 to 95 having the following formula 1:

(1)

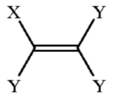

wherein: X is selected from the group consisting of —Cl, —F, or —CN, and Y is each independently selected from the group consisting of H, Cl, F, CN, $CF_3$, $CH_3$, $C_2H_5$, n—$C_3H_7$, iso—$C_3H_7$, n—$C_4H_9$, n—$C_5H_{11}$, n—$C_6H_{13}$, $OCH_3$, $OC_2H_5$, phenyl, $C_6F_5$, $C_6Cl_5$, $CH_2Cl$, $CH_2F$, Cl, F, CN, $CF_3$, $C_2F_5$, n—$C_3F_7$, iso—$C_3F_7$, $OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$; and the second polymer is a microgel particle comprised, based on total weight of the monomer mixture, from about 5 to 50%, most preferably from about 5 to 20%, of a polymerizable carboxylic acid monomer, 2 to 20% of a difunctional crosslinking monomer, with the balance of the microgel composition comprising water-insoluble, ethylenically unsaturated or vinyl-type monomers.

The preferred monomers of formula (1) of this invention are acrylonitrile, methacrylonitrile, vinylidene chloride, vinylidene fluoride, vinylidene cyanide, vinyl chloride, vinyl fluoride, tetrafluoroethylene, hexafluoropropylene, perfluoropropyl vinyl ether, substituted acrylonitriles including 2-ethylacrylonitrile, 2-n-propylacrylonitrile, 2-isopropylacrylonitrile, 2-n-butylacrylonitrile, 2-n-hexylacrylonitrile, 2-trifluoromethylacrylonitrile, 2-cyanoacrylonitrile, 2-chloroacrylonitrile, 2-bromoacrylonitrile,2-ethoxyacrylonitrile, cis-3-methoxyacrylonitrile, cis-3-ethoxyacrylonitrile 2-acetoxyacrylonitrile, fumaronitrile, maleonitrile. Most preferred monomers vinylidene chloride, vinyl chloride, acrylonitrile, methacrylonitrile, and vinylidene fluoride.

The thus obtained overcoat for imaged photographic or ink-jet materials has superior stain resistance, wet and dry scratch resistance, fingerprint resistance, and does not deteriorate light stability of the image dyes.

The present invention offers a unique combination of resistance to oil and water based spills, resistance to fingerprints, resistance to high temperature and high humidity blocking, and wipable silver-based photographic and ink-jet receiver material surfaces. This invention also solves magenta image dye fade limitations of analogous single component formulations on photographic materials containing 1H-pyrazolo[5,1-c]-1,2,4-triazole type magenta couplers.

DETAILED DESCRIPTION OF THE PREFERRED EMBODIMENT

While the image recording materials that have been applied with other disclosed dispersions, such as those described in U.S. Ser. No. 09/136,375, do provide the unique features of water resistance, fingerprint resistance and improved scratch resistance without the use of any volatile organic solvent compound released from the formulation, the present invention offers the additional benefit of using high Tg particles in the formulation to delay the film formation process during drying, and so prevent undesirable diffusion of organic compounds between imaging layers. To be more specific, when low Tg material was used solely in the formulation, subsequent light stability degradation of magenta image dye was observed. The addition of high Tg latex particles in the formulation eliminates this detrimental degradation of image dye light stability.

However, the addition of high Tg latex particles often introduces undesirable haze and degrades the glossy appearance of the print. Therefore, there remains a need for an aqueous coatable, water-resistant, fingerprint-resistant and highly glossy protective coating having excellent physical handling characteristics, that can be easily coated on image recording materials, dried into a continuous layer under drying conditions typical of photographic processing equipment, while not releasing volatile organic compounds.

It was discovered that the gloss degradation problems caused by the ordinary high Tg polymer latexes can be solved by the use of water-swellable microgel particles containing carboxylic acid monomers. The present invention describes a material formulation free of volatile organic compounds or solvents that is applied to an image recording material and dried under ordinary drying conditions to form a water resistant, scratch resistant, and fingerprint resistant durable overcoat. The material composition described in the present invention is a combination of at least two colloidal dispersions of water insoluble polymeric materials. At least one of the polymeric materials has glass transition temperature less than or equal to 30° C. in order to form a continuous film layer at the mild drying conditions, such as used in the photographic processing equipment, and contains one or more comonomers of this invention (see structure (1) below) at 75% to 100% and preferably 80% to 95% by weight based on the total monomers. The comonomer is represented by the formula:

(1)

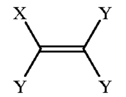

wherein: X is selected from the group consisting of Cl, F or CN, and Y is each independently selected from the group consisting of H, Cl, F, CN, $CF_3$, $CH_3$, $C_2H_5$, n—$C_3H_7$, iso—$C_3H_7$, n—$C_4H_9$, n—$C_5H_{11}$, n—$C_6H_{13}$, $OCH_3$, $OC_2H_5$, phenyl, $C_6F_5$, $C_6Cl_5$, $CH_2Cl$, $CH_2F$, $C_2F_5$, n—$C_3F_7$, iso—$C_3F_7$, $OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$.

The preferred monomers of formula (1) of this invention are acrylonitrile, methacrylonitrile, vinylidene chloride, vinylidene fluoride, vinylidene cyanide, vinyl chloride, vinyl fluoride, tetrafluoroethylene, hexafluoropropylene, perfluoropropyl vinyl ether, substituted acrylonitriles including 2-ethylacrylonitrile, 2-n-propylacrylonitrile, 2-isopropylacrylonitrile, 2-n-butylacrylonitrile, 2-n-hexylacrylonitrile, 2-trifluoromethylacrylonitrile, 2-cyanoacrylonitrile, 2-chloroacrylonitrile, 2-bromoacrylonitrile,2-ethoxyacrylonitrile, cis-3-methoxyacrylonitrile, cis-3ethoxyacrylonitrile 2-acetoxyacrylonitrile, fumaronitrile, maleonitrile. Most preferred monomers vinylidene chloride, vinyl chloride, acrylonitrile, methacrylonitrile, and vinylidene fluoride.

The second component is a microgel particle which is included in the formulation to provide toughness and non-tacky surface, to control the rate of film formation and to preserve magenta dye light stability. Preferred microgel particle compositions are selected based on their minimal contribution to gloss degradation.

Microgel particles are highly crosslinked polymer particles prepared by the emulsion polymerization. The definition of microgel particles can be found in British Polymer Journal 21, 107–115(1989) by W. Funke and in Angew. Chem. 100, 1813–1817 (1988) by M. Antonietti. Microgel particles are highly crosslinked and thus not soluble in any solvents but are dispersible in water. The preferred microgel particles of this invention have Tg equal to or greater than 60° C., average particle size between 20 nm and 80 nm and preferably 30 nm to 70 nm and are highly water-swellable. The microgels of this invention can broadly be described as crosslinked particles of copolymer containing as its essential monomeric components a small amount of a difunctional crosslinking monomer, a polymerizable carboxylic acid monomer and one or more polymerizable low water-solubility vinyl monomers. Microgel particles of this invention typically comprise from about 5 to 50%, and most preferably from about 5 to 20% by total weight of the monomer mixture of the polymerizable carboxylic acid monomer, 2 to 20% of difunctional crosslinking monomer, with the balance of the microgel composition comprising water-insoluble, vinyl or addition-type monomers.

Examples of the polymerizable carboxylic acid monomer are methacrylic acid, acrylic acid, crotonic acid, itaconic acid, maleic acid, fumaric acid, various other substituted carboxylic acid monomers containing from 3 to 8 carbon atoms such as 2-carboxyethylacrylate, 3-acryloamido-3-methyl-butanoic acid, 3-acryloamidohydroxy-acetic acid, acryloamidohexanoic acid, N,N-bisacryloamido-acetic acid, and the monoesters of dicarboxylic acids such as methyl hydrogen maleate, ethyl hydrogen fumarate, and the like, of which methacrylic acid is particularly preferred.

Another monomeric component of the microgel particles is the relatively water-insoluble, carboxylic-free vinyl monomer. Suitable monomers of this class include styrene, the o-, m-, and p-alkyl or aryl styrenes wherein the substituent group has from 1 to 8 carbon atom such as o-methylstyrene, m-ethylstyrene, p-methylstyrene, p-tert-butylstyrene, the 2,4-, 2,5- and 3,4-dimethylstyrenes, 4-methoxystyrene, 4-phenylstyrene, 4phenoxystyrene, 4-benzylstyrene, 2,6-dimethylstyrene, 2,6-dimethoxystyrene, 2,5-diethylstyrene, alpha-methylstyrene, 3,4dimethylstyrene, halostyrenes such as 4-chlorostyrene, the 2,5-, 3,4- and 2,6-dichlorostyrene, and the corresponding fluorostyrenes and bromstyrenes; vinyl toluene, isopropenyl toluene, and vinylnaphthalene; alkyl or aryl esters of the ethylenically unsaturated carboxylic acids having from 1 to about 8 carbon atoms in the ester (alcohol) group, such as the methyl, ethyl, propyl, butyl, hexyl, ethylhexyl, phenyl, and benzyl methacrylates, acrylates, and crotonates; dimethyl maleate; dibutylmaleate; dibutylfumarate; dihexylitaconate; nitrile monomers, such as acrylonitrile and methacrylonitrile; vinyl esters such as vinyl acetate, vinyl propionate, vinyl stearate, vinyl butyrate, vinyl laurate, etc.; and mixtures thereof. Preferred monomers are styrene and its derivatives and methacrylate monomers such as methyl methacrylate and ethyl methacrylate, such that the resulting microgel particle has a Tg equal to or greater than 60° C. Two or more preferred monomers can also be polymerized together in accordance with any of the various solubility and polymerizability requirements discussed above.

The difunctional crosslinking monomer is employed in an amount sufficient to crosslink the aqueous emulsion copolymer, thereby converting the copolymer to a non-linear polymeric microgel, without appreciably reducing the water-swellability. Typical amounts of the difunctional monomer are from 1 to 20% and more preferably from 2 to 10% of the total polymer composition. Illustrative of difunctional crosslinking agents which may be used in the present invention are compounds such as ethylene glycol dimethacrylate, methylene bisacrylamide, methylene bismethacrylamide, divinyl benzene, vinyl methacrylate, vinyl crotonate, vinyl acrylate, divinyl acetylene, trivinyl benzene, glycerine trimethylacrylate, pentaerythritol tetramethacrylate, triallyl cyanurate, divinyl ethane, divinyl sulfide, divinyl sulfone, hexatriene, triethyleneglycol dimethacrylate, diallyl cyanamide, glycol diacrylate, ethylene glycol divinyl ether, diallyl phthalate, divinyl dimethyl silane and glycerol trivinyl ether, of which divinyl benzene and ethylene glycol dimethacrylate are particularly preferred.

The microgel particles may be prepared by any conventional aqueous emulsion polymerization technique known to those skilled in the art. Suitable polymerization techniques of these types are described for example, in U.S. Pat. Nos. 3,492,252 and 4,139,514, incorporated in its entirety herein by reference. Typically, the microgel particles are prepared by emulsifying the monomeric materials and water soluble polymerization catalysts, in water with a suitable emulsifier for the monomers, and then heating the resulting aqueous emulsion at a temperature of from about 30° C. to about 95° C., preferably from about 60° C. to about 80° C., in a stirred heated reactor for a time from about one to about four hours until the polymerization reaction is complete. The ratio of monomer to water media is selected in order to provide a polymer emulsion having a solids content of from about 10 to about 45%, and preferably from about 20 to about 40% by weight.

The polymerization process can be carried out batchwise or semi-continuously. It is possible to work entirely batchwise, emulsifying the entire charge of monomer and proceeding with polymerization. It is usually advantageous, however, to start with part of the monomers which are to be used and add monomers as polymerization proceeds. An advantage of the gradual addition of monomers lies in reaching a high solids content with optimum control of particle size distribution. The other advantage of the semi-continuous process is that the final microgel particles tend to have much smaller particle size. Typical emulsifiers and catalysts used for the preparation of microgel particles are listed in U.S. Pat. No. 4,560,714. A chain transfer agent may optionally be present during the polymerization reaction at a concentration of from about 0 to about 5%. The preferred chain transfer agents are those that are relatively water soluble since they are more effective in the aqueous polymerization systems than are those that are water insoluble. Illustrative of such materials are the known alkyl and aryl mercaptans such as the essentially water soluble butyl mercaptan, mercaptoacetic acid, mercaptoethanol, 3-mercapto-1,2-propanediol and 2-methyl-2-propanethiol. Many water insoluble mercaptans can also be used, such as t-dodecyl mercaptan, phenyl mercaptan, n-dodecyl mercaptan, and tetradecyl mercaptan.

The particle size of the microgel particles of this invention is from 20 to 80 nm and more preferably from 30 to 70 nm.

Some of the preferred microgel particles are shown in the Table 1 below.

TABLE 1

| Polymer I.D. | Composition | Weight Ratio |
|---|---|---|
| MP-1 | Methyl Methacrylate | 80 |
| | Methacrylic Acid | 5 |
| | Ethylene Glycol Dimethacrylate | 15 |
| MP-2 | Methyl Methacrylate | 80 |
| | Methacrylic Acid | 15 |
| | Ethylene Glycol Dimethacrylate | 5 |
| MP-3 | Methyl Methacrylate | 75 |
| | Methacrylic Acid | 15 |
| | Ethylene Glycol Dimethacrylate | 10 |
| MP-4 | Methyl Methacrylate | 80 |
| | Methacrylic Acid | 10 |
| | Ethylene Glycol Dimethacrylate | 10 |
| MP-5 | Ethyl Methacrylate | 80 |
| | Methacrylic Acid | 10 |
| | Ethylene Glycol Dimethacrylate | 10 |
| MP-6 | Ethyl Methacrylate | 75 |
| | Methacrylic Acid | 15 |
| | Ethylene Glycol Dimethacrylate | 10 |
| MP-7 | Ethyl Methacrylate | 85 |
| | Methacrylic Acid | 10 |
| | Ethylene Glycol Dimethacrylate | 5 |
| MP-8 | Styrene | 80 |
| | Methacrylic Acid | 10 |
| | Divinyl Benzene | 10 |
| MP-9 | Styrene | 80 |
| | Methacrylic Acid | 15 |
| | Divinyl Benzene | 5 |
| MP-10 | Styrene | 75 |
| | Methacrylic Acid | 15 |
| | Divinyl Benzene | 10 |
| MP-11 | Styrene | 90 |
| | Methacrylic Acid | 5 |
| | Divinyl Benzene | 5 |
| MP-12 | Styrene | 80 |
| | Acrylic Acid | 10 |
| | Divinyl Benzene | 10 |

TABLE 1-continued

| Polymer I.D. | Composition | Weight Ratio |
|---|---|---|
| MP-13 | Styrene | 80 |
| | Acrylic Acid | 15 |
| | Divinyl Benzene | 5 |
| MP-14 | Styrene | 80 |
| | Methacrylic Acid | 10 |
| | Ethylene Glycol Dimethacrylate | 10 |
| MP-15 | Styrene | 80 |
| | Methacrylic Acid | 15 |
| | Ethylene Glycol Dimethacrylate | 5 |
| MP-16 | Methyl Methacrylate | 80 |
| | Methacrylic Acid | 10 |
| | Divinyl Benzene | 10 |
| MP-17 | Ethyl Methacrylate | 80 |
| | Methacrylic Acid | 10 |
| | Divinyl Benzene | 10 |
| MP-18 | Vinyl Toluene | 80 |
| | Methacrylic Acid | 10 |
| | Divinyl Benzene | 10 |
| MP-19 | Ethyl Methacrylate | 80 |
| | Acrylic Acid | 10 |
| | Ethylene Glycol Dimethacrylate | 10 |
| MP-20 | Methyl Methacrylate | 40 |
| | Ethyl Methacrylate | 40 |
| | Methacrylic Acid | 10 |
| | Ethylene Glycol Dimethacrylate | 10 |
| MP-21 | Methyl Methacrylate | 40 |
| | n-Butyl Methacrylate | 40 |
| | Methacrylic Acid | 10 |
| | Ethylene Glycol Dimethacrylate | 10 |
| MP-22 | Styrene | 40 |
| | n-Butyl Methacrylate | 40 |
| | Methacrylic Acid | 10 |
| | Ethylene Glycol Dimethacrylate | 10 |
| MP-23 | Styrene | 40 |
| | n-Butyl Methacrylate | 40 |
| | Methacrylic Acid | 10 |
| | Divinyl Benzene | 10 |
| MP-24 | Ethyl Methacrylate | 40 |
| | n-Butyl Methacrylate | 40 |
| | Methacrylic Acid | 10 |
| | Ethylene Glycol Dimethacrylate | 10 |
| MP-25 | Ethyl Methacrylate | 30 |
| | n-Butyl Methacrylate | 50 |
| | Methacrylic Acid | 10 |
| | Ethylene Glycol Dimethacrylate | 10 |
| MP-26 | Ethyl Methacrylate | 45 |
| | n-Butyl Methacrylate | 45 |
| | Methacrylic Acid | 5 |
| | Ethylene Glycol Dimethacrylate | 5 |
| MP-27 | Ethyl Methacrylate | 40 |
| | n-Butyl Methacrylate | 50 |
| | Methacrylic Acid | 5 |
| | Ethylene Glycol Dimethacrylate | 5 |
| MP-28 | Styrene | 45 |
| | n-Butyl Methacrylate | 45 |
| | Methacrylic Acid | 5 |
| | Ethylene Glycol Dimethacrylate | 5 |

The weight ratio of the microgel particles to the low Tg film forming materials defined in structure (1) can be from 3:97 to 50:50 by weight. The average particle size of the first low Tg colloidal dispersions of hydrophobic materials can be from 20 nm to 250 nm. The dry laydown of the total materials on the surface of the image recording material can be from 30 mg/sq.ft. to 600 mg/sq. ft. Other components commonly used in image recording materials or photographic processing solutions, such as biocides, spreading aids (surfactants), lubricants and waxes can also be incorporated in the formulation as needed. The concentration of the formulation can be from 1% solids to 50% solids depending on the thickness of the protective layer one wishes to apply, the machine speed, the dryer efficiency and other factors that may affect the solution uptake by the image recording materials.

Photographic elements are among the imaged elements protected in accordance with this invention. Typically, the exemplified elements are derived from silver halide photographic elements that can be black and white elements (for example, those which yield a silver image or those which yield a neutral tone image from a mixture of dye forming couplers), single color elements or multicolor elements. Multicolor elements typically contain dye image-forming units sensitive to each of the three primary regions of the spectrum. The imaged elements can be imaged elements which are viewed by transmission, such a negative film images, reversal film images and motion picture prints or they can be imaged elements that are viewed by reflection, such as paper prints. Because of the amount of handling that can occur with paper prints and motion picture prints, they are preferred imaged photographic elements for use in this invention.

The photographic elements in which the images to be protected are formed can have the structures and components shown in Research Disclosure 37038. Specific photographic elements can be those shown on pages 96–98 of Research Disclosure 37038 as Color Paper Elements 1 and 2. A typical multicolor photographic element comprises a support bearing a cyan dye image-forming unit comprised of at least one red-sensitive silver halide emulsion layer having associated therewith at least one cyan dye-forming coupler, a magenta dye image-forming unit comprising at least one green-sensitive silver halide emulsion layer having associated therewith at least one magenta dye-forming coupler, and a yellow dye image-forming unit comprising at least one blue-sensitive silver halide emulsion layer having associated therewith at least one yellow dye-forming coupler. The element can contain additional layers, such as filter layers, interlayers, overcoat layers, subbing layers, and the like. All of these can be coated on a support which can be transparent (for example, a film support) or reflective (for example, a paper support). Support bases that can be used include both transparent bases, such as those prepared from polyethylene terephthalate, polyethylene naphthalate, cellulosics, such as cellulose acetate, cellulose diacetate, cellulose triacetate, and reflective bases such as paper, coated papers, melt-extrusion-coated paper, and laminated papers, such as those described in U.S. Pat. Nos. 5,853,965; 5,866,282; 5,874,205; 5,888,643; 5,888,681; 5,888,683; and 5,888,714. Photographic elements protected in accordance with the present invention may also include a magnetic recording material as described in *Research Disclosure,* Item 34390, Nov. 1992, or a transparent magnetic recording layer such as a layer containing magnetic particles on the underside of a transparent support as described in U.S. Pat. Nos. 4,279,945 and 4,302,523.

Suitable silver halide emulsions and their preparation, as well as methods of chemical and spectral sensitization, are described in Sections I through V of Research Disclosure 37038. Color materials and development modifiers are described in Sections V through XX of Research Disclosure 37038. Vehicles are described in Section II of Research Disclosure 37038, and various additives such as brighteners, antifoggants, stabilizers, light absorbing and scattering materials, hardeners, coating aids, plasticizers, lubricants and matting agents are described in Sections VI through X and XI through XIV of Research Disclosure 37038. Processing methods and agents are described in Sections XIX and XX of Research Disclosure 37038, and methods of exposure are described in Section XVI of Research Disclosure 37038.

Photographic elements typically provide the silver halide in the form of an emulsion. Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like). Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like.

Photographic elements can be imagewise exposed using a variety of techniques. Typically exposure is to light in the visible region of the spectrum, and typically is of a live image through a lens. Exposure can also be to a stored image (such as a computer stored image) by means of light emitting devices (such as LEDs, CRTs, etc.).

Images can be developed in photographic elements in any of a number of well known photographic processes utilizing any of a number of well known processing compositions, described, for example, in T. H. James, editor, *The Theory of the Photographic Process,* 4th Edition, Macmillan, N.Y., 1977. In the case of processing a color negative element, the element is treated with a color developer (that is one which will form the colored image dyes with the color couplers), and then with an oxidizer and a solvent to remove silver and silver halide. In the case of processing a color reversal elementor color paper element, the element is first treated with a black and white developer (that is, a developer which does not form colored dyes with the coupler compounds) followed by a treatment to render developable unexposed silver halide (usually chemical or light fogging), followed by treatment with a color developer. Development is followed by bleach-fixing, to remove silver or silver halide, washing and drying.

Photographic images may also be produced using ink-jet printing. This printing technology is reviewed in an article titled "Progress and Trends in Ink-Jet Printing Technology" by Hue P. Le in the Journal of Imaging Science and Technology, Volume 42, Number 1 (January/February 1998), pp. 49–61. Essentially, ink droplets, typically in the volume range 1–100 picoliters, are ejected from a printhead to a receiver material on which the image is formed. The ink-jet printhead may be of the continuous or drop-on-demand varieties. Several physical mechanisms for drop ejection are known, but the currently most popular among these are thermal and piezoelectric. In the thermal mechanism, ink in the printhead is heated to form a water vapor bubble that expels one or more ink droplets out of the printhead toward the receiver. Representative thermal ink-jet printheads are described in, for example, U.S. Pat. No. 4,723,129 of Endo et al. (Canon) and U.S. Pat. No. 4,490,728 of Vaught et al. (Hewlett Packard). In the piezoelectric mechanism, one or more droplets are expelled from the printhead by a physical deformation that accompanies a voltage change across a piezoelectric material forming a part of the printhead structure. Representative piezoelectric printheads are described in, for example, U.S. Pat. No. 4,459,601 of Howkins (Exxon) and U.S. Pat. No. 5,563,634 of Masahiro et al. (Seiko Epson). Ink-jet inks may be either aqueous- or organic solvent-based. Aqueous inks are preferred for printing in home, office and retail environments. In addition to water and one or more colorants, such as dyes or pigments, an aqueous ink typically contains one or more humectants, which affect ink viscosity and volatility, one or more surfactants, which affect the wetting and penetrating properties of the ink, and a biocide, which extends the useful life of the ink. Aqueous inks may also contain many other ingredients, including metal ion chelating agents, pH buffers, defoamers, and dispersing agents. It is well known to improve the tone scale or bit depth of an image by using more than one ink density for each color. Representative ink-jet inks are described in, for example, U.S. Pat. Nos. 5,571,850 of Ma et al. (DuPont), 5,560,770 of Yatake (Seiko Epson), and 5,738,716 of Santilli et al. (Eastman Kodak). Ink-jet receivers may be reflective, transparent, or of intermediate transparency (e.g., for day/night display materials). At minimum, an ink-jet receiver includes a support and an ink receiving layer. The simplest ink-jet receiver is plain paper, in which these two functions are combined. As a practical matter, more complex receiver structures are required for improved image quality and physical properties. Specifically formulated ink receiving layers coated on paper or other supports improve color density and dot resolution. Receiver composition and structure may also be modified to improve properties such as wettability, ink absorptivity, drying time, gloss, reduced image artifacts, waterfastness, and light and dark stability. Representative ink-jet receiver structures and compositions are described in, for example, U.S. Pat. Nos. 4,954,395 of Hasegawa et al. (Canon), 5,725,961 of Ozawa et al. (Seiko Epson), and 5,605,750 of Romano et al. (Eastman Kodak).

The present invention is illustrated by the following examples.

Synthesis Examples

Comparison Examples

Comparison Example C1

Ethyl Acrylate/Vinylidene Chloride/Itaconic Acid(10/88/2)

8.75 g of Rhodacal™ A-246L and 875 g of deionized water were charged to a 3 liter three neck flask equipped with mechanical stirrer and dry ice-acetone condenser. The system was purged with nitrogen for 30 minutes. A monomer emulsion was obtained by mixing 455 g of distilled water, 8.75 g of Rhodacal™ A-246L, 70 g of ethyl acrylate, 14 g of itaconic acid, 616 g of vinylidene chloride and 13 g of 10% sodium persulfate with magnetic stirring. The reactor was immersed in a constant temperature bath at 35° C. 1.3 g of sodium persulfate, 2.6 g of sodium metabisulfite and 2 g of 1% ferrous sulfate were added to the reactor and then the monomer emulsion was pumped to the reactor over two hours. The latex was stirred one more hour and 1 ml each of t-butyl hydroperoxide(10%) and sodium formaldehyde bisulfite(10%) were added twice at 20 minute intervals and stirred one more hour. The latex was cooled and filtered. Glass transition temperature was 9° C. as measured by DSC, average particle size obtained from PCS was 60 nm and % solids was 32.3%.

Comparison Example C2

Methyl Methacrylate/2-Acrylamido-2-methyl-1-propanesulfonic acid, Sodium Salt (98/2)

400 g deionized water and 2.25 g of sodium dodecyl sulfate (SDS) were charged to a 1-liter three-neck round-bottom flask equipped with a mechanical stirrer and nitrogen inlet. The solution was purged with nitrogen for 30 min and heated to 80° C. in a constant temperature bath. 49 g of methyl methacrylate and 1 g of 2-acrylamido-2-methyl-1-propanesufonic acid(sodium salt) were added and stirred for three minutes. 4.5 g each of 10% sodium persulfate and 10% sodium metabisulfite were added to initiate the polymerization. Polymerization was continued for one hour and heated one more hour at 80° C. Temperature was reduced to 65–70° C. and 1 ml each of t-butyl hydroperoxide (10%) and sodium formaldehyde bisulfite (10%) were post-added. Latex was cooled and filtered. Glass transition temperature was 120° C., average particle size was 45 nm, and % solids was 10.1%.

Comparison Example C3

Methyl Methacrylate/Ethylene Glycol Dimethacrylate (95/5)

400 g deionized water and 2.25 g of sodium dodecyl sulfate(SDS) were charged to a 1-liter three-neck round-bottom flask equipped with a mechanical stirrer and nitrogen inlet. The solution was purged with nitrogen for 30 min and heated to 80° C. in a constant temperature bath. 42.75 g of methyl methacrylate and 2.25 g of ethyl glycol dimethacrylate were added and stirred for three minutes. 4.5 g each of 10% sodium persulfate and 10% sodium metabisulfite were added to initiate the polymerization. Polymerizaiton was continued for one hour and heated one more hour at 80° C. Temperature was reduced to 65–70° C. and 1 ml each of t-butylhydroperoxide(10%) and sodium formaldehyde bisulfite(10%) were post-added. Latex was cooled and filtered. Glass transition temperature was 111° C., average particle size was 47 nm, and % solids was 10.1%.

Comparison Example C4

Ethyl Methacrylate/ 2-Acrylamido-2-methyl-1-propanesufonic acid, Sodium Salt (95/5)

6 g of Rhodacal™ A-246L and 360 g of deionized distilled water were mixed in a one-liter three-neck flask equipped with a condenser and nitrogen inlet. The system was purged with nitrogen for 30 min at 80° C. 5 g of ethyl methacrylate and 0.5 g of NaAMPS was added followed by 5 ml of 10% sodium persulfate and 10% sodium metabisulfite to initiate the polymerization as seed. The polymerization was continued for 20 minutes. A monomer emulsion comprising 90 g of ethyl methacrylate, 9.5 g of NaAMPS, 1.5 g of Rhodacal™ A-246L, 5 g of 10% sodium persulfate, and 40 g of deionized water was pumped into the reactor over two hours. The polymerization was continued for one more hour after the monomer feeding was finished. The latex was cooled and filtered. Glass transition temperature was 73° C., average particle size was 42 nm, and % solids was 19.05%.

Comparison Example C5

Ethyl Methacrylate/n-Butyl Methacrylate/Ethylene Glycol Dimethacrylate//2-Acrylamido-2-methyl-1-propanesufonic acid, Sodium Salt (44/45/10/1)

540 g of deionized water and 5 g of sodium dodecyl sulfate were charged to a 2-liter three-neck round- bottom flask equipped with a mechanical stirrer and nitrogen inlet. The solution was purged with nitrogen for 30 min and heated to 80° C. in a constant temperature bath. 1 g of sodium persulfate was added and stirred for one min. A monomer emulsion comprising 5 g of SDS, 1 g of sodium persulfate, 88 g of ethyl methacrylate, 90 g of n-butyl methacrylate, 20 g of ethylene glycol dimethacrylate, and 4 g of NaAMPS was pumped into the reactor over two hours. The polymerization was continued for one more hour. 1 ml each of t-butylhydroperoxide(10%) and sodium formaldehyde bisulfite(10%) were post-added and stirred for 20 minutes. The latex was cooled and filtered. Glass transition temperature was 64° C., average particle size was 37 nm and % solids was 20.6%.

Comparison Example C6

Ethyl Methacrylate/n-Butyl Methacrylate/Ethylene Glycol Dimethacrylate/2-Acrylamido-2-methyl-1-propanesufonic acid, Sodium Salt (40/49/10/1)

Same as C5 except that the monomer emulsion was composed of 5 g SDS, 1 g of sodium persulfate, 80 g of ethyl methacrylate, 98 g of n-butyl methacrylate, 20 g of ethylene glycol dimethacrylate and 4 g of NaMPS. Glass transition temperature was 52° C., average particle size was 37 nm and % solids was 21.7%.

Comparison Example C7

Ethyl Methacrylate/Ethylene Glycol Dimethacrylate (90/10)

Same as C5 except that monomer emulsion was composed of 5 g of SDS, 1 g of sodium persulfate, 180 g of ethyl methacrylate, and 20 g of ethylene glycol dimethacrylate. Tg was 74° C., average particle size was 33 nm and % solids was 20.4%.

Comparison Example C8

Ethyl Methacrylate/n-Butyl Methacrylate/Ethylene Glycol Dimethacrylate (55/35/10)

Same as C5 except that monomer emulsion was composed of 5 g of SDS, 1 g of sodium persulfate, 110 g of ethyl methacrylate, 70 g of n-butyl methacrylate, and 20 g of ethylene glycol dimethacrylate. Glass transition temperature was 60° C., average particle size was 29 nm and % solids was 20.7%.

Invention Examples

Invention Example MP1

Methyl Methacrylate/Ethylene Glycol Dimethacrylate/Methacrylic Acid (80/15/5)

400 g deionized water, 2.25 g of sodium dodecyl sulfate (SDS) were charged to a 1-liter three-neck round-bottom flask equipped with a mechanical stirrer and nitrogen inlet. The solution was purged with nitrogen for 30 min and heated to 80° C. in a constant temperature bath. 36 g of methyl methacrylate, 2.25 g of methacrylic acid and 6.75 g of ethylene glycol dimethacrylate were added and stirred for three minutes. 4.5 g of 10% sodium persulfate were added to initiate the polymerization. Polymerization was continued for one hour at 80° C. Temperature was reduced to 60° C. and 1 ml each of t-butyl hydroperoxide(10%) and sodium formaldehyde bisulfite(10%) were post-added and stirred for 30 min. The latex was cooled and filtered. Glass transition temperature was 141° C., average particle size was 42 nm, and % solids was 10%.

Invention Example MP-2

Methyl Methacrylate/Ethylene Glycol Dimethacrylate/ Methacrylic Acid (80/5/15)

Same as MP-1 except that 36 g of methyl methacrylate, 6.75 g of methacrylic acid and 2.25 g of ethyl glycol dimethacrylate were used. Glass transition temperature was 128° C., average particle size was 35 nm and % solids was 10%.

Invention Example MP-3

Methyl Methacrylate/Ethylene Glycol Dimethacrylate/ Methacrylic Acid (75/10/15)

Same as MP-1 except that 33.75 g of methyl methacrylate, 6.75 g of methacrylic acid and 4.5 g of ethyl glycol dimethacrylate were used. Glass transition temperature was about 150° C., average particle size was 29 nm and % solids was 10%.

Invention Example MP4

Methyl Methacrylate/Ethylene Glycol Dimethacrylate/ Methacrylic Acid (80/10/10)

1000 g deionized water and 11.25 g of sodium dodecyl sulfate (SDS) were charged to a 2-liter three-neck round-bottom flask equipped with mechanical stirrer and nitrogen inlet. The solution was purged with nitrogen for 30 min and heated to 60° C. in a constant temperature bath. 180 g of methyl methacrylate, 22.5 g of methacrylic acid and 22.5 g of ethylene glycol dimethacrylate were added and stirred for three min. 22.5 g of 10% sodium persulfate and 10% sodium formaldehyde bisulfite were added to initiate the polymerization. Polymerization was continued for two hours at 60° C. 1 ml each of t-butyl hydroperoxide (10%) and sodium formaldehyde bisulfite (10%) were post-added and stirred for 30 min. The latex was cooled and filtered. Glass transition temperature was 144° C., average particle size was 45 nm, and % solids was 10%.

Invention Example MP-24

Ethyl Methacrylate/n-Butyl Methacrylate/Ethylene Glycol Dimethacrylate/Methacrylic Acid (40/40/10/10)

2160 g of deionized water and 20 g of SDS were charged to a 2-liter three-neck round-bottom flask equipped with a mechanical stirrer and nitrogen inlet. The solution was purged with nitrogen for 30 min and heated to 80° C. in a constant temperature bath. 4 g of sodium persulfate was added and stirred for one min. A monomer emulsion comprising 20 g of SDS, 4 g of sodium persulfate, 320 g of ethyl methacrylate, 320 g of n-butyl methacrylate, 80 g of methacrylic acid, and 80 g of ethylene glycol dimethacrylate was pumped in to the reactor over two hours. The polymerization was continued for one more hour. 4 ml each of t-butylhydroperoxide (10%) and sodium formaldehyde bisulfite (10%) were post-added and stirred 20 min. The latex was cooled and filtered. Glass transition temperature was 83° C., average particle size was 34 nm and % solids was 20.5%.

Invention Example MP-25

Ethyl Methacrylate/n-Butyl Methacrylate/Ethylene Glycol Dimethacrylate/Methacrylic Acid (40/50/5/5)

Same as C5 except that the monomer emulsion was composed of 5 g of SDS, 1 g of sodium persulfate, 60 g of ethyl methacrylate, 100 g of n-butyl methacrylate, 20 g of methacrylic acid, and 20 g of ethylene glycol dimethacrylate. The final particle size was 34 nm, % solids was 21.1% and Tg was 89° C.

Invention Example MP-26

Ethyl Methacrylate/n-Butyl Methacrylate/Ethylene Glycol Dimethacrylate/Methacrylic Acid (45/45/5/5)

Same as C5 except that the monomer emulsion was composed of 5 g of SDS, 1 g of sodium persulfate, 90 g of ethyl methacrylate, 90 g of n-butyl methacrylate, 10 g of methacrylic acid, and 10 g of ethylene glycol dimethacrylate. Glass transition temperature was 66° C., average particle size was 38 nm and % solids was 21.1%.

Invention Example MP-27

Ethyl Methacrylate/n-Butyl Methacrylate/Ethylene Glycol Dimethacrylate/Methacrylic Acid (40/50/5/5)

Same as C5 except that the monomer emulsion was composed of 5 g of SDS, 1 g of sodium persulfate, 80 g of ethyl methacrylate, 100 g of n-butyl methacrylate, 10 g of methacrylic acid, and 10 g of ethylene glycol dimethacrylate. Glass transition temperature was 69° C., average final particle size was 39 nm and % solid was 20.9%.

Invention Example MP-28

Styrene/n-Butyl Methacrylate/Ethylene Glycol Dimethacrylate/Methacrylic Acid (45/45/5/5)

1080 g of deionized water and 25 g of Rhodacal™ A-246L were charged to a 2-liter three-neck round- bottom flask equipped with mechanical stirrer and nitrogen inlet. The solution was purged with nitrogen for 30 min and heated to 80° C. in a constant temperature bath. 2 g of sodium persulfate was added and stirred for one min. A monomer emulsion comprising 25 g of Rhodacal™ A-246L, 2 g of sodium persulfate, 180 g of styrene, 180 g of n-butyl methacrylate, 20 g of methacrylic acid, and 20 g of ethylene glycol dimethacrylate was pumped in to the reactor over two hours. The polymerization was continued for one more hour. 2 ml each of t-butylhydroperoxide(10%) and sodium formaldehyde bisulfite(10%) were post added and stirred 20 minutes. The latex was cooled and filtered. Glass transition temperature was 75° C., average particle size was 44 nm and % solids was 20.6%.

Characterization of Polymeric Materials

Glass Transition Temperature and Melting Temperature

Both glass transition temperature (Tg) and melting temperature (Tm) of the dry polymer material were determined by differential scanning calorimetry (DSC), using a heating rate of 20° C./minute. Tg is defined herein as the inflection point of the glass transition and Tm is defined herein as the peak of the melting transition.

Particle Size Measurement

All particles were characterized by Photon Correlation Spectroscopy using a Zetasizer Model DTS5100 manufactured by Malvern Instruments. Z-average particle sizes are reported.

Sample Preparation

Kodak Edge 7 Ektacolor paper was exposed with a step tablet wedge to three different colors (red, green and blue) on a Kodak Automatic 312 Color Printer and processed by HOPE 3026 processor using RA-4 chemicals to provide cyan, magenta and yellow colors.

Samples on color photographic paper were prepared by coating aqueous colloidal dispersions on the exposed/processed Kodak Edge 7 Ektacolor paper described above at 3.0 cc/sq.ft. with drying temperature of 140° F. to simulate the photofinishing process. Surfactant FT-248 (available from Bayer) and two wax particles (Jonwax 26, 40 nm polyethylene particle emulsion available from SC Johnson; and ML160, 150 nm Carnauba wax particle emulsion available from Michelman) were used at the dry laydowns of 2 mg, 10 mg and 10 mg per square foot respectively in all formulations to control the surface tension and coefficient of friction.

Examples on a porous type of ink-jet receiver were prepared by methods similar to those used for color photographic paper, to apply coatings to Konica QP™ receiver imaged using an Epson 740™ ink-jet printer and Epson inks. Examples on a continuous gelatin-based ink-jet receiver were prepared by methods similar to those used for color photographic paper, to apply coatings to receiver imaged using a Hewlett-Packard Photosmart™ ink-jet printer and Photosmart™ inks.

Sample Testing

Test for Water Resistance

Ponceau Red dye is known to stain gelatin through ionic interaction. Ponceau red dye solution was prepared by dissolving 1 gram of dye in 1000 grams mixture of acetic acid and water (5 parts:95 parts). Samples were soaked in the dye solution for 5 minutes followed by a 30-second water rinse to removed excess dye solution on the coating surface, then air dried. A sample with a good water-resistant protective layer does not change in appearance by this test. Samples showed very dense red color if there was no protective overcoat applied to the surface or the formulation did not form a protective overcoat layer to provide the water resistance property.

Gloss Measurement

Gloss measurement of samples was done on Gardner micro-tri-gloss meter, taking the average of five readings at a 20-degree angle.

Test for Fingerprint Resistance

Thermaderm, a specially formulated mixture (see preparation below) to mimic fingerprint oil, was applied to the surface of the protective overcoat by smearing with a finger at approximately 1 mg Thermaderm over an area of 1 sq. cm.. The sample was left for 24 hours at room conditions (often 70° F./50%RH) and then wiped with cotton cloth to clean up the surface. The test area was ranked according to the following observations.

A: no mark of fingerprints was observed.

B: very mild/faint fingerprints on the protective overcoat layer were observed.

C: very obvious fingerprint mark by Thermaderm on the protective overcoat layer was observed.

D: protective overcoat layer was removed on wiping.

A ranking of "A" is most desirable, "B" is acceptable, "C" and "D" are not acceptable at all.

| Thermaderm formulation: | |
|---|---|
| Non-aqueous Phase | |
| Corn oil | 78.96 grams |
| Mineral oil | 25.26 grams |
| Glycerin | 52.64 grams |
| Stearyl alcohol | 15.79 grams |
| Oleic acid | 63.16 grams |
| Sorbitan monooleate | 21.05 grams |
| Cetyl palmitate | 6.32 grams |
| Oleyl alcohol | 6.32 grams |
| Stearic acid | 31.58 grams |
| Lexemul AR | 47.36 grams |
| Cholesterol | 9.47 grams |
| Methylparaben | 4.21 grams |
| Butyl paraben | 3.16 grams |
| Butylated hydroxytoluene | 0.21 grams |
| Butylated hydroxyanisole | 0.21 grams |
| Vitamin E acetate | 0.13 grams |
| Cetyl alcohol | 15.79 grams |
| Squalene | 15.79 grams |
| Aqueous Phase | |
| Pegosperse 1750 MS-K | 31.58 grams |
| Distilled water | 571.01 grams |

1. Ingredients were added in the order listed. The corn oil was carefully heated using a warm water bath to aid in the dissolution of the non-aqueous phase.

2. Aqueous phase was warmed to aid in the dissolution of the Pegosperse.

3. Aqueous phase was quickly added to the non-aqueous phase with vigorous agitation.

The resultant suspension was then partially emulsified with an air powered polytron for approximately 5 minutes.

4. Complete emulsification was accomplished by processing through a microfluidizer.

5. After preparation store material in tightly sealed container. Keep frozen, removing a small quantity from jar as needed.

Image dye stability test

Samples were subjected to a fading test using the typical Xenon fadeometer with filtered glass as a light source. The samples were irradiated for 4 weeks at a distance such that the irradiance on the sample was 50 Klux. Areas with density closest to 1.0 in three colors (yellow, magenta and cyan) were chosen for observation. The densities of such areas on the sample before and after light fade test were read by X-Write Densitometer using Reflection mode, and the % loss was calculated and reported based on the equation shown below:

% loss=(1-(density after fade test/density before fade test))×100

EXAMPLE 1

A series of samples were prepared with the protective overcoat formulation described in Table 2.

TABLE 2

| Sample ID | Overcoat Composition (in mg/sq. ft.) | Gloss Change | Water Resistance | % density loss by light exposure Cyan | Magenta | Yellow | Fingerprint Resistance | Note |
|---|---|---|---|---|---|---|---|---|
| 1.0 | none | | no | −26% | −53% | −34% | C | photographic paper comparison |
| 1.1 | C1 @ 200 | reference | yes | −20% | −75% | −33% | A | photographic paper comparison |
| 1.2 | C1 @ 180 C2 @ 45 | −6.9 units compared to sample 1.1 | yes | −23% | −62% | −27% | A | photographic paper comparison |
| 1.3 | C1 @ 180 C3 @ 45 | −6.8 units compared to sample 1.1 | yes | −23% | −63% | −27% | A | photographic paper comparison |
| 1.4 | C1 @ 180 C4 @ 45 | −5.9 units compared to sample 1.1 | yes | −24% | −58% | −28% | A | photographic paper comparison |
| 1.5 | C1 @ 180 MP-1 @ 45 | −3.8 units compared to sample 1.1 | yes | −23% | −58% | −27% | A | photographic paper invention |
| 1.6 | C1 @ 180 MP-2 @ 45 | −1.7 units compared to sample 1.1 | yes | −23% | −54% | −25% | A | photographic paper invention |
| 1.7 | none | | no | — | — | — | C | porous ink-jet receiver comparison |
| 1.8 | C1 @ 200 MP-28 @ 50 | +68.0 units compared to sample 1.7 | yes | — | — | — | A | porous ink-jet receiver invention |
| 1.9 | none | | no | — | — | — | C | gelatin ink-jet receiver comparison |
| 1.10 | C1 @ 200 MP-28 @ 50 | +17.1 units compared to sample 1.9 | yes | — | — | — | A | gelatin ink-jet receiver invention |

As presented in Table 1, sample 1.0 is the Edge 7 sample without any novel latex overcoat, and therefore does not possess any water resistance property. Sample 1.1 shows that with a low Tg overcoat, the water resistance and gloss of the color paper were greatly improved but light stability of the magenta dye deteriorated. With the addition of small particle size high-Tg latex particles in the formula, such as shown in samples 1.2 through 1.6, the magenta image dye light stability was greatly improved and the yellow dye light stability was better than the sample 1.0. However, samples 1.5 and 1.6 using the microgels of this invention did not reduce the gloss number as much as the conventional small particle size latices in samples 1.2 to 1.4. For ink-jet receivers, the novel latex coating also improved gloss and water resistance. All samples except the uncoated comparisons (sample 1.0, 1.7 and 1.9) had satisfactory fingerprint resistance.

EXAMPLE 2

A different series of samples were prepared with the protective overcoat formulation described in Table 3.

TABLE 3

| Sample ID | Overcoat Composition (in mg/sq. ft.) | Gloss Change | Water Resistance | % density loss by light exposure Cyan | Magenta | Yellow | Fingerprint Resistance | Note |
|---|---|---|---|---|---|---|---|---|
| 2.0 | none | | no | −22% | −48% | −35% | C | comparison |
| 2.1 | C1 @ 200 | reference | yes | −19% | −64% | −31% | A | comparison |
| 2.2 | C1 @ 165 C3 @ 35 | −9.9 units compared to sample 2.1 | yes | −20% | −54% | −29% | A | comparison |
| 2.3 | C1 @ 160 C3 @ 40 | −8.5 units compared to sample 2.1 | yes | −19% | −53% | −27% | A | comparison |

TABLE 3-continued

| Sample ID | Overcoat Composition (in mg/sq. ft.) | Gloss Change | Water Resistance | % density loss by light exposure Cyan | Magenta | Yellow | Fingerprint Resistance | Note |
|---|---|---|---|---|---|---|---|---|
| 2.4 | C1 @ 170<br>C4 @ 30 | −7.4 units compared to sample 2.1 | yes | −24% | −50% | −25% | A | comparison |
| 2.5 | C1 @ 160<br>C4 @ 40 | −9.5 units compared to sample 2.1 | yes | −24% | −45% | −25% | A | comparison |
| 2.6 | C1 @ 150<br>C4 @ 50 | −11.6 units compared to sample 2.1 | yes | −23% | −43% | −26% | A | comparison |
| 2.7 | C1 @ 165<br>MP-3 @ 35 | −2.3 units compared to sample 2.1 | yes | −20% | −46% | −27% | A | invention |
| 2.8 | C1 @ 160<br>MP-3 @ 40 | −2.6 units compared to sample 2.1 | yes | −21% | −46% | −29% | A | invention |
| 2.9 | C1 @ 170<br>MP-4 @ 30 | −1.1 units compared to sample 2.1 | yes | −20% | −46% | −26% | A | invention |
| 2.10 | C1 @ 160<br>MP-4 @ 40 | −2.2 units compared to sample 2.1 | yes | −21% | −39% | −24% | A | invention |
| 2.11 | C1 @ 150<br>MP-4 @ 50 | −3.3 units compared to sample 2.1 | yes | −22% | −39% | −24% | A | invention |

As presented in Table 2, sample 2.0 is the Edge 7 sample without any novel latex overcoat, and therefore does not possess water resistance property. Sample 2.1 was overcoated with only low Tg latex (C1) and again shows worst image dye stability. The addition of a high Tg latex particles in the formula, such as shown in samples 2.2 through 2.11, greatly solves the deterioration of magenta image dye stability. However, samples 2.2 to 2.6, where conventional small particle size high-Tg latex particles were used, suffer from the low gloss appearance, while samples 2.7 through 2.11 show less gloss degradation by the addition of invention particles. Samples 2.10 and 2.11 actually have better magenta and yellow light stability than the un-overcoated sample 2.0. Samples 2.1 through 2.11 all exhibited satisfactory fingerprint resistance of ranking A, while sample 2.0 was given a ranking of C.

EXAMPLE 3

A different series of samples were prepared with the protective overcoat formulation described in Table 4.

TABLE 4

| Sample ID | Overcoat Composition (in mg/sq. ft.) | Gloss Change | Water Resistance | Fingerprint Resistance | Note |
|---|---|---|---|---|---|
| 3.0 | none | reference | no | C | comparison |
| 3.1 | C1 @ 200<br>C5 @ 50 | −3.0 units compared to sample 3.0 | yes | A | comparison |
| 3.2 | C1 @ 200<br>C6 @ 50 | −4.6 units compared to sample 3.0 | yes | A | comparison |
| 3.3 | C1 @ 200<br>C7 @ 50 | −5.7 units compared to sample 3.0 | yes | A | comparison |
| 3.4 | C1 @ 200<br>C7 @ 50 | −4.8 units compared to sample 3.0 | yes | A | comparison |
| 3.5 | C1 @ 200<br>MP-24 @ 50 | +1.7 units compared to sample 3.0 | yes | A | invention |

TABLE 4-continued

| Sample ID | Overcoat Composition (in mg/sq. ft.) | Gloss Change | Water Resistance | Fingerprint Resistance | Note |
|---|---|---|---|---|---|
| 3.6 | C1 @ 200<br>MP-25 @ 50 | +1.0 unit compared to sample 3.0 | yes | A | invention |
| 3.7 | C1 @ 200<br>MP-26 @ 50 | −1.7 units compared to sample 3.0 | yes | A | invention |
| 3.8 | C1 @ 200<br>MP-27 @ 50 | −1.1 units compared to sample 3.0 | yes | A | invention |
| 3.9 | C1 @ 200<br>MP-28 @ 50 | +2.3 units compared to sample 3.0 | yes | A | invention |

As presented in Table 4, sample 3-0 is the Edge 7 sample without any novel latex overcoat, and therefore does not possess water resistance or fingerprint resistance property. Samples 3.1 through 3.4 are overcoated with a non-microgel latex having glass transition temperature higher than 60° C., and therefore showed noticeable gloss degradation compared to the uncoated sample 3.0. The use of high Tg microgel latex particles in the formula, such as shown in samples 3.5 through 3.9 produced samples with much better gloss. Samples 3.1 through 3.9 showed comparable image dye stability compared to sample 3.0. Samples 3.1 through 3.9 all exhibited satisfactory fingerprint resistance while sample 3.0 has no finger print resistance.

EXAMPLE 4

Two different photographic papers listed below were used to prepare samples of this invention.

(1) Kodak Ektacolor Edge™7

(2) experimental photographic paper A

Experimental photographic paper A was prepared by coating blue-light sensitive layer, interlayer, green-light sensitive layer, interlayer, red-light sensitive layer, UV layer and overcoat simultaneously utilizing curtain coating on polyethylene laminated photographic paper support. Coupler dispersions were emulsified by methods well known to the art. The components in each individual layer are described below.

Blue Sensitive Emulsion (Blue EM-1). A high chloride silver halide emulsion is precipitated by adding approximately equimolar silver nitrate and sodium chloride solutions into a well stirred reactor containing glutaryldiaminophenyldisulfide, gelatin peptizer and thioether ripener. Cesium pentachloronitrosylosmate(II) dopant is added during the silver halide grain formation for most of the precipitation, followed by the addition of potassium hexacyanonithenate(II), potassium (5-methylthiazole)-pentachloroiridate, a small amount of KI solution, and shelling without any dopant. The resultant emulsion contains cubic shaped grains having edge length of 0.6 micrometers. The emulsion is optimally sensitized by the addition of a colloidal suspension of aurous sulfide and heat ramped to 60° C. during which time blue sensitizing dye BSD4, potassium hexchloroiridate, Lippmann bromide and 1-(3-acetamidophenyl)-5-mercaptotetrazole were added.

Green Sensitive Emulsion (Green EM-1): A high chloride silver halide emulsion is precipitated by adding approximately equimolar silver nitrate and sodium chloride solutions into a well stirred reactor containing, gelatin peptizer and thioether ripener. Cesium pentachloronitrosylosmate(II) dopant is added during the silver halide grain formation for most of the precipitation, followed by the addition of potassium (5-methylthiazole)-pentachloroiridate. The resultant emulsion contains cubic shaped grains of 0.3 micrometers in edge length size. The emulsion is optimally sensitized by the addition of glutaryldiaminophenyldisulfide, a colloidal suspension of aurous sulfide and heat ramped to 55° C. during which time potassium hexachloroiridate doped Lippmann bromide, a liquid crystalline suspension of green sensitizing dye GSD-1, and 1-(3-acetamidophenyl)-5-mercaptotetrazole were added. Red Sensitive Emulsion (Red EM-1): A high chloride silver halide emulsion is precipitated by adding approximately equimolar silver nitrate and sodium chloride solutions into a well stirred reactor containing gelatin peptizer and thioether ripener. During the silver halide grain formation, potassium hexacyanoruthenate (II) and potassium (5-methylthiazole)-pentachloroiridate are added. The resultant emulsion contains cubic shaped grains of 0.4 micrometers in edge length size. The emulsion is optimally sensitized by the addition of glutaryldiaminophenyldisulfide, sodium thiosulfate, tripotassium bis {2-[3-(2-sulfobenzamido)phenyl]-mercaptotetrazole} gold(I) and heat ramped to 64° C. during which time 1-(3-acetamidophenyl)-5-mercaptotetrazole, potassium hexachloroiridate, and potassium bromide are added. The emulsion is then cooled to 40° C., pH adjusted to 6.0 and red sensitizing dye RSD-1 is added.

| Layer | Item | Laydown ($mg/ft^2$) |
|---|---|---|
| Layer 1 | Blue Sensitive Layer | |
| | Gelatin | 122.0 |
| | Blue sensitive silver (Blue EM-1) | 22.29 |
| | Y-4 | 38.49 |
| | ST-23 | 44.98 |

-continued

| | | |
|---|---|---|
| | Tributyl Citrate | 20.24 |
| | ST-24 | 11.25 |
| | ST-16 | 0.883 |
| | Sodium Phenylmercaptotetrazole | 0.009 |
| | Piperidino hexose reductone | 0.2229 |
| | 5-chloro-2-methyl-4-isothiazolin-3-one/2-methyl-4-isothiazolin-3-one(3/1) | 0.019 |
| | SF-1 | 3.40 |
| | Potassium chloride | 1.895 |
| | Dye-1 | 1.375 |
| Layer 2 | Interlayer | |
| | Gelatin | 69.97 |
| | ST-4 | 9.996 |
| | S-4 | 18.29 |
| | 5-chloro-2-methyl-4-isothiazolin-3-one/2-methyl-4-isothiazolin-3-one(3/1) | 0.009 |
| | Catechol disulfonate | 3.001 |
| | SF-1 | 0.753 |
| Layer 3 | Green Sensitive Layer | |
| | Gelatin | 110.96 |
| | Green sensitive silver (Green EM- 1) | 9.392 |
| | M-4 | 19.29 |
| | Oleyl Alcohol | 20.20 |
| | S-4 | 10.40 |
| | ST-21 | 3.698 |
| | ST-22 | 26.39 |
| | Dye-2 | 0.678 |
| | 5-chloro-2-methyl-4-isothiazolin-3-one/2-methyl-4-isothiazolin-3-one(3/1) | 0.009 |
| | SF-1 | 2.192 |
| | Potassium chloride | 1.895 |
| | Sodium Phenylmercaptotetrazole | 0.065 |
| Layer 4 | MIC Interlayer | |
| | Gelatin | 69.97 |
| | ST-4 | 9.996 |
| | S-4 | 18.29 |
| | Acrylamide/t-Butylacrylamide sulfonate copolymer | 5.026 |
| | Bis-vinylsulfonylmethane | 12.91 |
| | 3,5-Dinitrobenzoic acid | 0.009 |
| | Citric acid | 0.065 |
| | Catechol disulfonate | 3.001 |
| | 5-chloro-2-methyl-4-isothiazolin-3-one/2-methyl-4-isothiazolin-3-one(3/1) | 0.009 |
| Layer 5 | Red Sensitive Layer | |
| | Gelatin | 125.96 |
| | Red Sensitive silver (Red EM-1) | 17.49 |
| | IC-35 | 21.59 |
| | IC-36 | 2.397 |
| | UV-1 | 32.99 |
| | Dibutyl sebacate | 40.49 |
| | S-6 | 13.50 |
| | Dye-3 | 2.127 |
| | Potassium p-toluenethiosulfonate | 0.242 |
| | 5-chloro-2-methyl-4-isothiazolin-3-one/2-methyl-4-isothiazolin-3-one(3/1) | 0.009 |
| | Sodium Phenylmercaptotetrazole | 0.046 |
| | SF-1 | 4.868 |
| Layer 6 | UV Overcoat | |
| | Gelatin | 76.47 |
| | UV-2 | 3.298 |
| | UV-1 | 18.896 |
| | ST-4 | 6.085 |
| | SF-1 | 1.162 |
| | S-6 | 7.404 |
| | 5-chloro-2-methyl-4-isothiazolin-3-one/2-methyl-4-isothiazolin-3-one(3/1) | 0.009 |
| Layer 7 | SOC | |
| | Gelatin | 59.98 |
| | Ludox AM ™ (colloidal silica) | 14.99 |
| | Polydimethylsiloxane (DC200 ™) | 1.877 |
| | 5-chloro-2-methyl-4-isothiazolin-3-one/2-methyl-4-isothiazolin-3-one(3/1) | 0.009 |

-continued
| | |
|---|---|
| SF-2 | 0.297 |
| Tergitol 15-S-5 ™ (surfactant) | 0.186 |
| SF-1 | 0.753 |
| Aerosol OT ™ (surfactant) | 0.269 |
IC-35
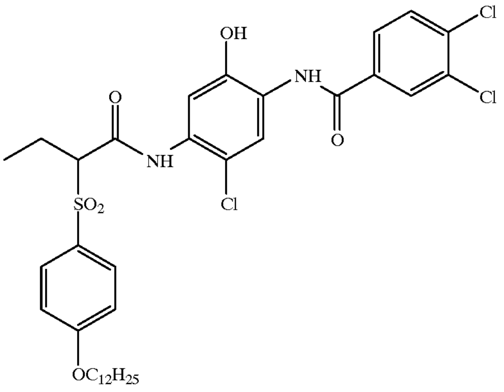
IC-36
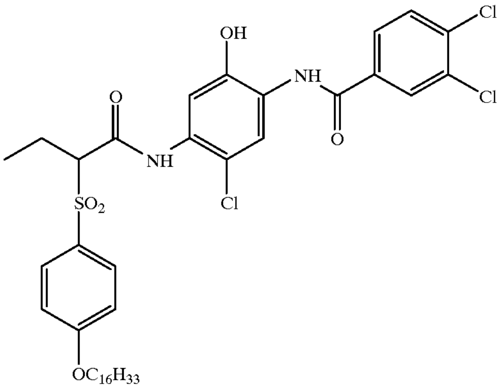
M-4
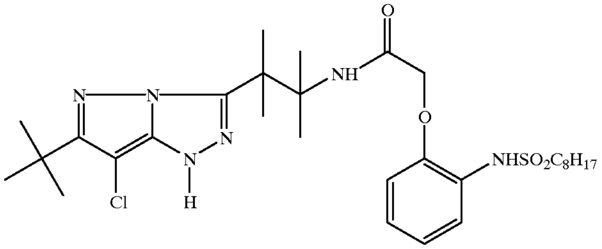
Y-4
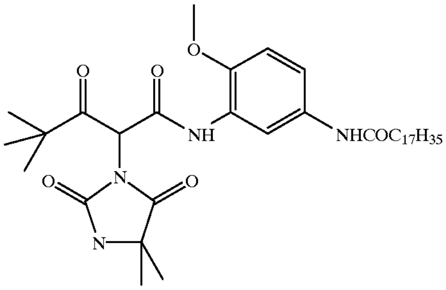
ST-16

-continued
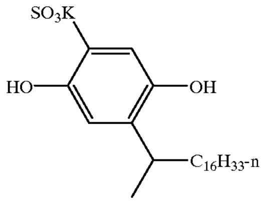
ST-4
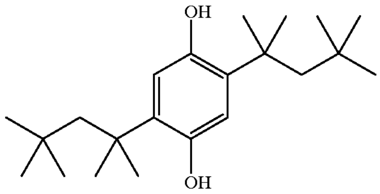
ST-21
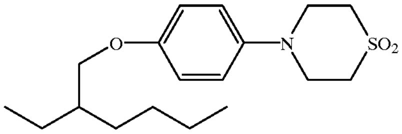
ST-22
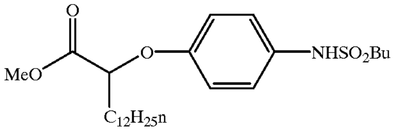
ST-23
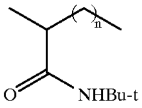
+
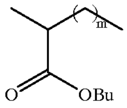
n:m = 1:1; MW = 75,000 to 100,000
ST-24
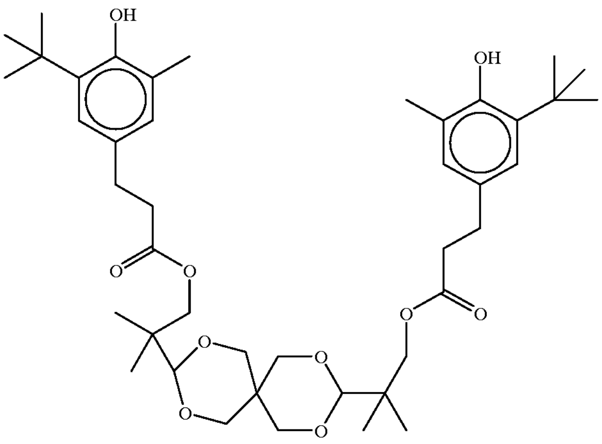
UV-1

-continued
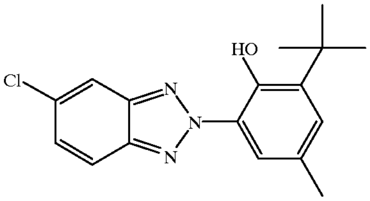
UV-2
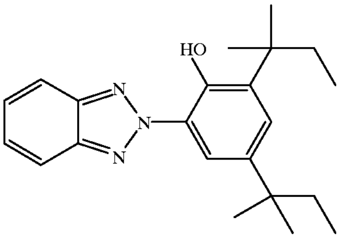
SF-1
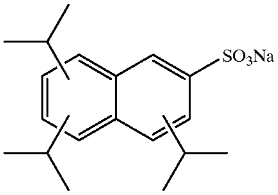
$CF_3.(CF_2)_7.SO_3Na$ SF-2
S-4 = Diundecyl phthalate
S-6 = Tris(2-ethylhexyl)phosphate
BSD-4
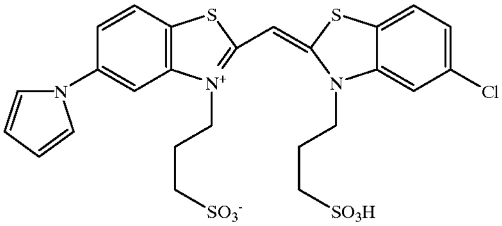
GSD-1
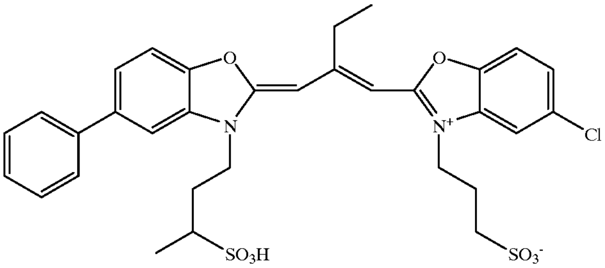
RSD-1

-continued

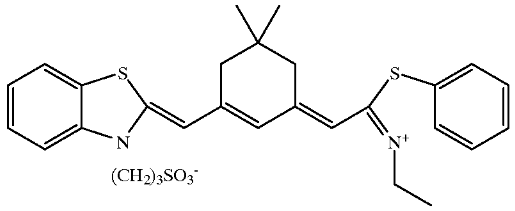

DYE-1

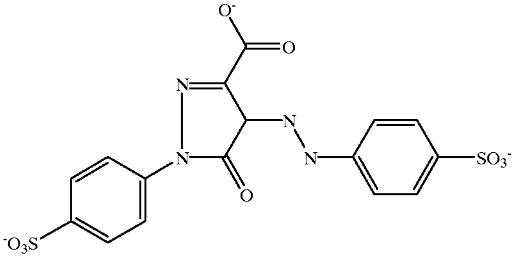

DYE-2

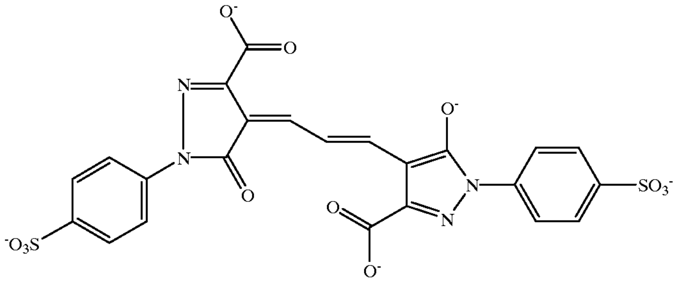

DYE-3

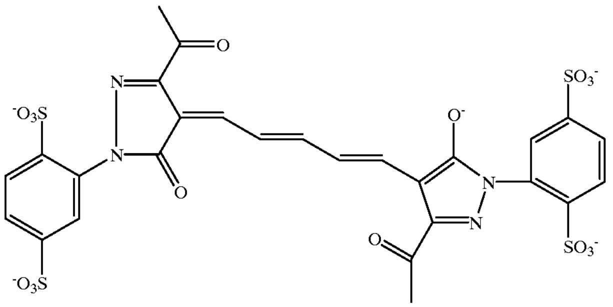

Two protective overcoat formula described in Table 5 were coated on each of the 2 papers, and the results are also shown in Table 5.

TABLE 5

| Sample ID | Photographic Paper | Overcoat Composition (in mg/sq. ft.) | Gloss Change | % Magenta density loss by light exposure (exposure time: 2 weeks) | Water Resistance | Fingerprint Resistance | Note |
|---|---|---|---|---|---|---|---|
| 4.1 | Ektacolor Edge 7 | none | reference | −16.0% | no | C | comparison |
| 4.2 | Ektacolor Edge 7 | C1 @ 200 | −2.7 units compared to sample 4.1 | −30.2% | yes | A | comparison |

TABLE 5-continued

| Sample ID | Photographic Paper | Overcoat Composition (in mg/sq. ft.) | Gloss Change | % Magenta density loss by light exposure (exposure time: 2 weeks) | Water Resistance | Fingerprint Resistance | Note |
|---|---|---|---|---|---|---|---|
| 4.3 | Ektacolor Edge 7 | C1 @ 200 MP-28 @ 50 | +5.3 units compared to sample 4.1 | −17.9% | yes | A | Invention |
| 4.4 | Experimental photographic paper A | none | reference | −8.2% | no | C | comparison |
| 4.5 | Experimental photographic paper A | C1 @ 200 | −10.3 units compared to sample 4.4 | −26.7% | yes | A | comparison |
| 4.6 | Experimental photographic paper A | C1 @ 200 MP-28 @ 50 | +1.2 units compared to sample 4.4 | −9.2% | yes | A | Invention |

Similar to the results shown in previous examples, samples 4.2 and 4.5 were prints overcoated with formula C1 at 200 mg per square foot dry laydown. These gave prints water resistance and fingerprint resistance, however, much degraded magenta dye fade compared to their corresponding uncoated prints of 4.1 and 4.4. The gloss for samples 4.2 and 4.5 was lower than usual, which was attributed to incomplete drying of latex overcoat. Samples 4.3 and 4.6 were overcoated with formula of this invention, which consisted of dry laydown of 200 mg of C1 and 50 mg of MP-28 per square foot. These samples exhibited more glossy appearance compared to their corresponding uncoated prints, comparable image dye stability, while providing superior protection from water and fingerprints.

EXAMPLE 5

Two different photographic papers listed below were used to prepare samples of this invention.

(1) experimental photographic paper B (2) experimental photographic paper C

Experimental photographic paper B was prepared identical to Kodak Ektacolor Edge 7 in image layers, except the paper support used was biaxially oriented support including a paper base and a biaxially oriented polypropylene sheet laminated to both sides of the paper base.

Experimental photographic paper C was prepared identical to experimental photographic paper A in image layers, except the paper support used was biaxially oriented support including a paper base and a biaxially oriented polypropylene sheet laminated to both sides of the paper base.

Two protective overcoat formulas described in Table 6 were coated on each of the two papers, and the results are also shown in Table 6.

TABLE 6

| Sample ID | Photographic Paper | Overcoat Composition (in mg/sq. ft.) | Gloss Change | Water Resistance | Fingerprint Resistance | Note |
|---|---|---|---|---|---|---|
| 5.1 | Experimental photographic paper B | none | reference | no | C | comparison |
| 5.2 | Experimental photographic paper B | C1 @ 200 | +4.6 units compared to sample 5.1 | yes | A | comparison |
| 5.3 | Experimental photographic paper B | C1 @ 200 MP-28 @ 50 | −1.0 units compared to sample 5.1 | yes | A | Invention |
| 5.4 | Experimental photographic paper C | none | reference | no | C | comparison |
| 5.5 | Experimental photographic paper C | C1 @ 200 | +1.7 units compared to sample 5.4 | yes | A | comparison |
| 5.6 | Experimental photographic paper C | C1 @ 200 MP-28 @ 50 | −1.3 units compared to sample 5.4 | yes | A | Invention |

Samples 5.2 and 5.5 were prints overcoated with formula of C1 at 200 mg per square foot dry laydown. They gave prints improved gloss, water resistance and fingerprint resistance compared to their corresponding uncoated prints of 5.1 and 5.4. Samples 5.3 and 5.6 were overcoated with formula of this invention, which consisted of dry laydown of 200 mg of C1 and 50 mg of MP-28 per square foot. These samples exhibited glossy appearance compared to their corresponding uncoated prints, while providing superior protection from water and fingerprints. Image fade data for these samples are anticipated to give the same results as shown in Table 5, as the image layers for paper B are the same as for Edge 7, and paper C the same as for paper A.

The invention has been described in detail with particular reference to certain preferred embodiments thereof, but it will be understood that variations and modifications can be effected within the spirit and scope of the invention.

What is claimed is:

1. A coating composition comprising at least one first water insoluble polymer having a Tg equal to or less than 30° C. and at least one second water insoluble polymer having a Tg equal to or greater than 60° C. wherein the first polymer comprises 75 to 100 weight percent of the monomer having the following formula 1:

(1)

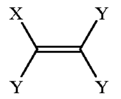

wherein: X is selected from the group consisting of —Cl, —F, or —CN, and Y is each independently selected from the group consisting of H, Cl, F, CN, $CF_3$, $CH_3$, $C_2H_5$, n—$C_3H_7$, iso—$C_3H_7$, n—$C_4H_9$, n—$C_5H_{11}$, n—$C_6H_{13}$, $OCH_3$, $OC_2H_5$, phenyl, $C_6F_5$, $C_6Cl_5$, $CH_2Cl$, $CH_2F$, Cl, F, CN, $CF_3$, $C_2F_5$, n—$C_3F_7$, i°so—$C_3F_7$,$OCF_3$, $OC_2F_5$, $OC_3F_7$, $C(CF_3)_3$, $CH_2(CF_3)$, $CH(CF_3)_2$, $COCF_3$, $COC_2F_5$, $COCH_3$, $COC_2H_5$; and the second polymer is a microgel particle.

2. The coating composition of claim 1 wherein the first polymer comprises 80 to 95 weight % of the monomer represented in formula (1).

3. The coating composition of claim 1 further comprising biocides, surfactants and lubricants.

4. The coating composition of claim 1 wherein the microgel particles comprise 5 to 50 weight percent of a polymerizable carboxylic acid monomer, based on the total weight of the monomer mixture.

5. The coating composition of claim 1 wherein the microgel particles comprise 2 to 20 weight percent of a difunctional crosslinking monomer, based on the total weight of the monomer mixture.

6. The coating composition of claim 1 wherein the microgel particles have an average particle size between 20 nm and 80 nm.

7. The coating composition of claim 1 wherein the microgel particles have an average particle size between 30 nm and 70 nm.

8. The coating composition of claim 1 wherein the ratio of the microgel particles :the first water insoluble polymer having a Tg equal to or less than 30° C. is between 3:97 and 50:50.

9. The coating composition of claim 1 wherein the ratio of the microgel particles: first water insoluble polymer having a Tg equal to or less than 30° C. is between 10:90 and 35:65.

* * * * *